(12) United States Patent
Ueno

(10) Patent No.: US 7,600,374 B2
(45) Date of Patent: Oct. 13, 2009

(54) REGENERATION CONTROL OF EXHAUST GAS FILTER

(75) Inventor: Shouichirou Ueno, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 287 days.

(21) Appl. No.: 11/610,390

(22) Filed: Dec. 13, 2006

(65) Prior Publication Data

US 2007/0130925 A1 Jun. 14, 2007

(30) Foreign Application Priority Data

Dec. 14, 2005 (JP) .............................. 2005-360069

(51) Int. Cl.
*F01N 3/00* (2006.01)

(52) U.S. Cl. .............................. 60/295; 60/278; 60/285; 60/286; 60/297

(58) Field of Classification Search ................... 60/278, 60/280, 285, 286, 295, 297, 300, 311
See application file for complete search history.

(56) References Cited

U.S. PATENT DOCUMENTS

| | | | | |
|---|---|---|---|---|
| 6,568,178 B2* | 5/2003 | Hirota et al. | ................... | 60/297 |
| 6,708,487 B2* | 3/2004 | Morimoto et al. | ............. | 60/311 |
| 7,043,903 B2* | 5/2006 | Onodera et al. | ................ | 60/295 |
| 7,104,049 B2* | 9/2006 | Hiranuma et al. | .............. | 60/295 |
| 7,243,491 B2* | 7/2007 | Okugawa et al. | ............... | 60/311 |
| 7,340,884 B2* | 3/2008 | Matsuno et al. | ................ | 60/295 |

FOREIGN PATENT DOCUMENTS

| | | |
|---|---|---|
| EP | 1 382 812 A1 | 1/2004 |
| EP | 1 426 591 A2 | 6/2004 |
| EP | 1 515 017 A2 | 3/2005 |
| EP | 1 582 719 A1 | 10/2005 |
| JP | 61-79814 A | 4/1986 |
| JP | 6-2597 A | 1/1994 |
| JP | 2002-364436 | 12/2002 |

* cited by examiner

*Primary Examiner*—Binh Q. Tran
(74) *Attorney, Agent, or Firm*—Foley & Lardner LLP

(57) ABSTRACT

A controller (70) controls regeneration of an exhaust gas filter (52) which traps particulate matter contained in exhaust gas to prevent the particulate matter from being discharged into the atmosphere. When regeneration of the exhaust gas filter (52) is underway and the engine (10) is decelerating, the controller (70) determines whether or not a catalyst (40) is active (S82) and whether the engine (10) is decelerating gently or rapidly (S83). When the engine (10) is decelerating gently, the controller (70) performs a post-injection following a main fuel injection (S824), and when the engine (10) is decelerating rapidly, the controller (70) performs the main fuel injection but stops the post-injection (S834). In so doing, the temperature of the filter does not rise excessively, and the filter can be prevented from melting.

7 Claims, 6 Drawing Sheets

FIG.4A
FIG.4B
FIG.4C
FIG.4D
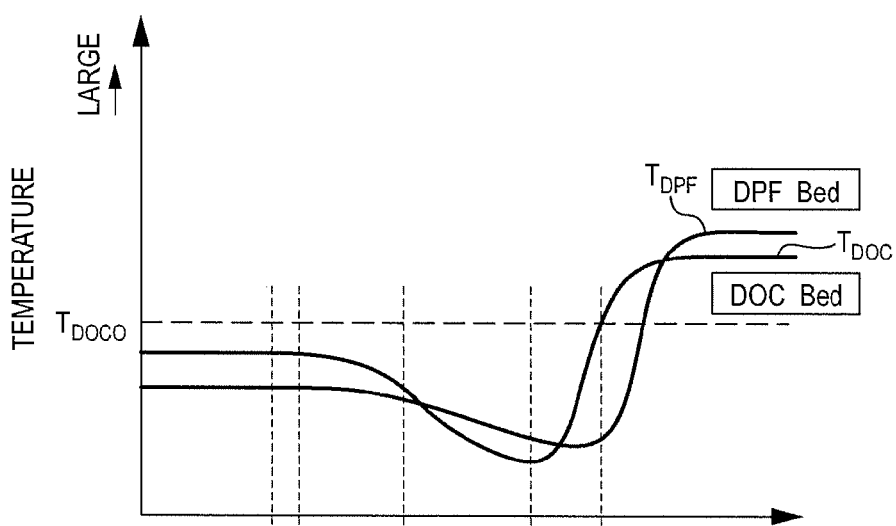
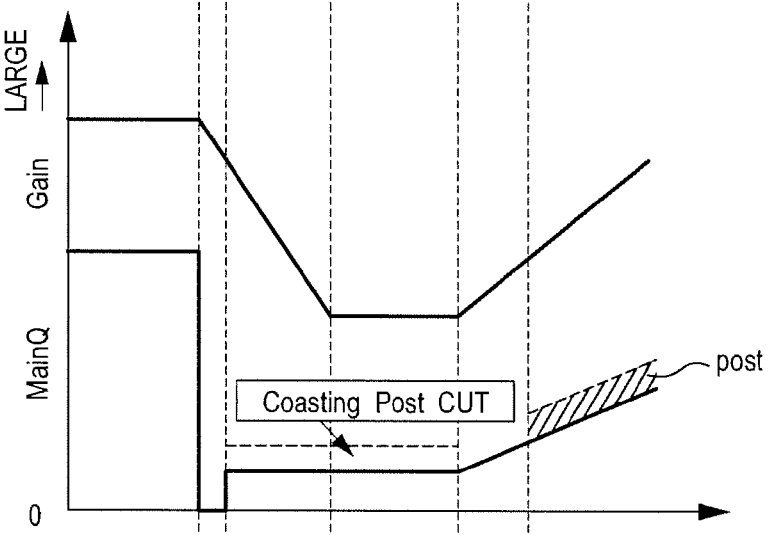
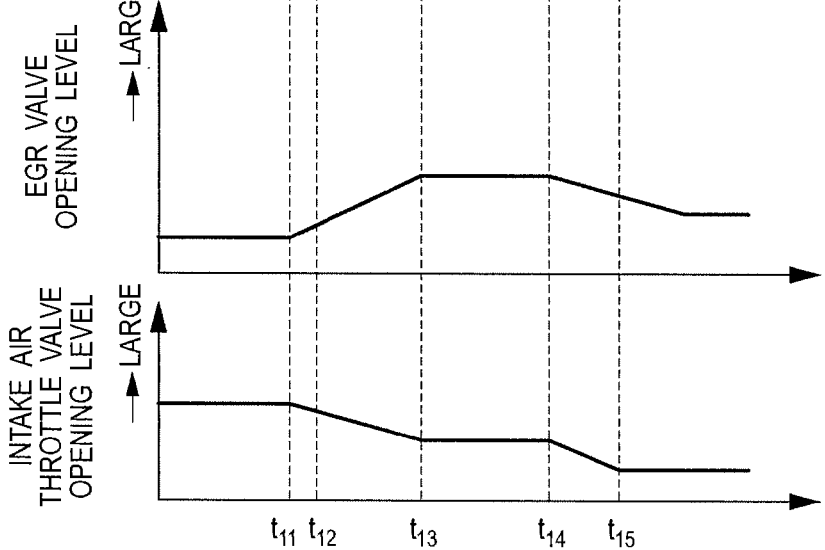
GENTLE DECELERATION WHEN CATALYST IS INACTIVE (DMODE=1)

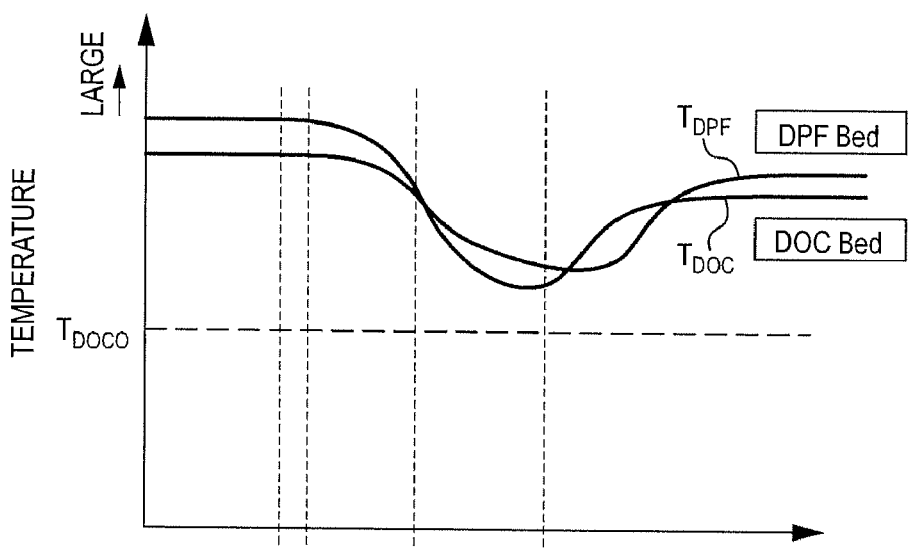
FIG.5A
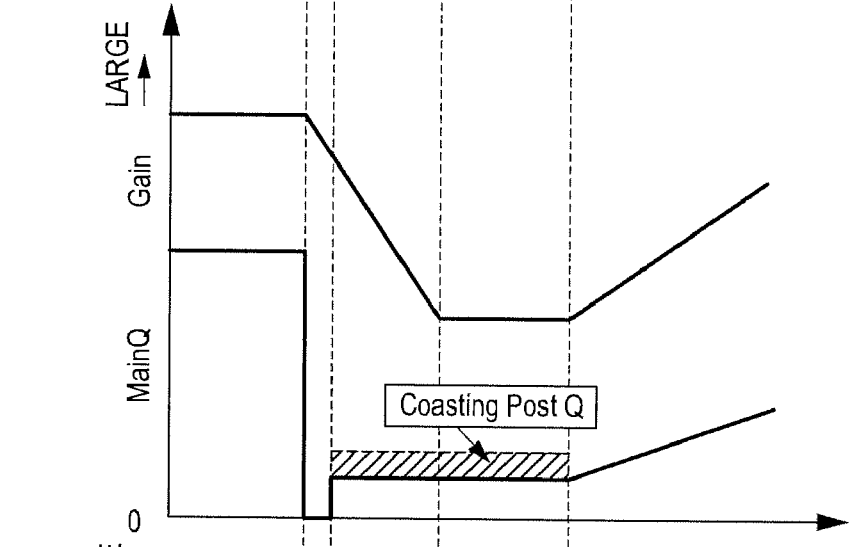
FIG.5B
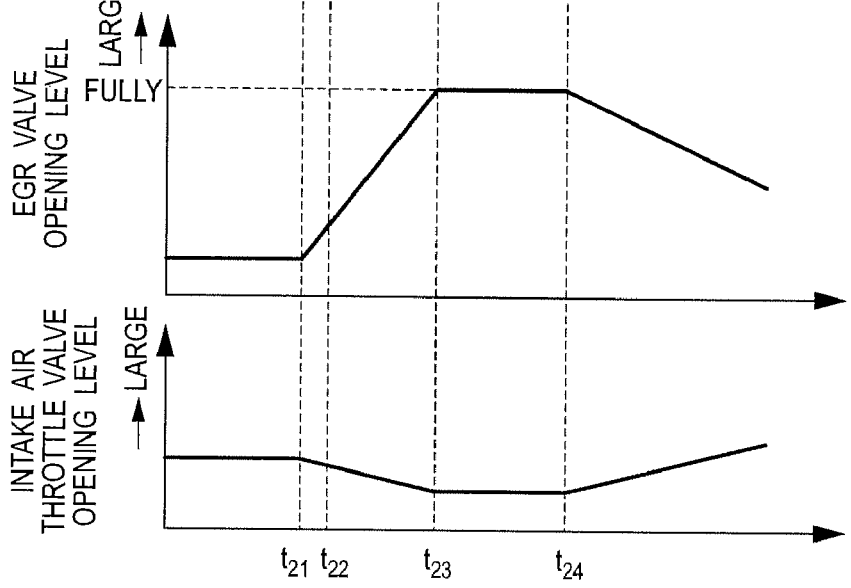
FIG.5C
FIG.5D
GENTLE DECELERATION WHEN CATALYST IS ACTIVE (DMODE=2)

RAPID DECELERATION WHEN CATALYST IS ACTIVE (DMODE=3)

REGENERATION CONTROL OF EXHAUST GAS FILTER

FIELD OF THE INVENTION

This invention relates to regeneration control of an exhaust gas filter that traps particulate matter contained in the exhaust gas of a diesel engine.

BACKGROUND OF THE INVENTION

An exhaust gas filter attached to an exhaust passage of a diesel engine for trapping particulate matter (to be abbreviated to PM hereafter) contained in exhaust gas to prevent the PM from being discharged into the atmosphere is known. As the exhaust gas filter continues to trap the PM, a blockage eventually occurs. Therefore, when the timing for performing regeneration processing on the exhaust gas filter is reached, for example, a post-injection for injecting additional fuel is performed in the diesel engine during an expansion stroke in addition to a main fuel injection. The fuel that is post-injected during the expansion stroke reaches a catalyst disposed upstream of the exhaust gas filter without being burned in a cylinder, and generates heat through a reaction with the catalyst. The heat burns the PM that has accumulated in the filter, and thus the exhaust gas filter is regenerated.

If the fuel reaches the catalyst during an inactive period when the temperature of the catalyst is low, unburned hydrocarbon contained in the fuel covers the surface of the catalyst, causing hydrocarbon poisoning (to be abbreviated to HC poisoning hereafter) which leads to a deterioration in the performance of the catalyst.

When the vehicle decelerates, the exhaust gas temperature decreases, leading to a reduction in the temperature of the catalyst, and hence HC poisoning is particularly likely to occur at this time.

In JP2002-364436A, published by the Japan Patent Office in 2002, additional fuel is not injected when the vehicle decelerates during filter regeneration to such an extent that the temperature of the catalyst falls below an activation temperature.

SUMMARY OF THE INVENTION

It was found as a result of research conducted by the inventors that if the additional fuel post-injection control described above is executed following rapid engine deceleration, the temperature of the filter may rise excessively, causing the filter to melt.

It is therefore an object of this invention to prevent melting of a filter caused by an excessive increase in the temperature of the filter, regardless of the operating conditions of a vehicle.

In order to achieve the above object, this invention provides an exhaust gas filter regeneration control device used together with a diesel engine which comprises a fuel injector which injects fuel into the engine, an exhaust gas filter which is provided in an exhaust passage of the engine, and which traps particulate matter contained in an exhaust gas of the engine to prevent the particulate matter from being discharged into the atmosphere, and a catalyst which is provided in the exhaust passage upstream of the exhaust gas filter, and which raises an exhaust gas temperature through a catalytic reaction with components of a post-injected fuel when the exhaust gas filter is to be regenerated.

The device comprises a programmable controller programmed to determine whether or not the engine is decelerating during the regeneration of the exhaust gas filter, determine whether or not the catalyst is active when the engine is decelerating, determine whether the engine is decelerating gently or decelerating rapidly when the catalyst is active, cause the fuel injector to perform a post-injection following a main fuel injection when the engine is decelerating gently, and cause the fuel injector to perform the main fuel injection but not to perform the post-injection when the engine is decelerating rapidly.

The details as well as other features and advantages of this invention are set forth in the remainder of the specification and are shown in the accompanying drawings.

BRIEF DESCRIPTION OF THE DRAWINGS

FIGS. 4A-4D are timing charts illustrating the results of control executed during gentle deceleration when a catalyst is inactive, according to this invention.

FIGS. 5A-5D are timing charts illustrating the results of control executed during gentle deceleration when the catalyst is active, according to this invention.

DESCRIPTION OF THE PREFERRED EMBODIMENTS

Figure 1:
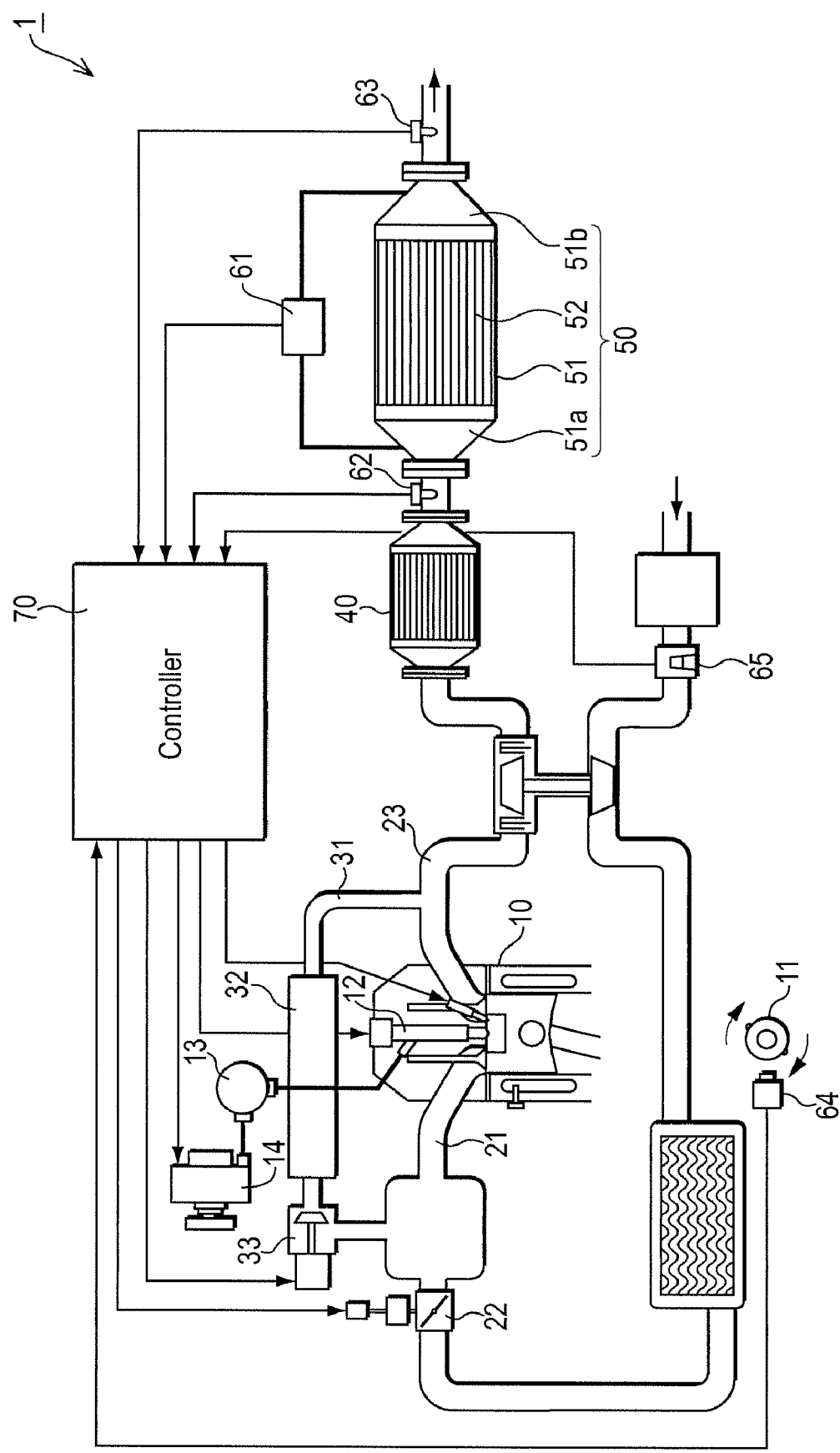
FIG. 1 is a schematic diagram showing an exhaust gas filter regeneration control device according to this invention.

Referring to FIG. 1 of the drawings, a diesel engine 10 for a vehicle comprises an intake passage 21, an intake air throttle valve 22, an exhaust passage 23, an exhaust gas recirculation (to be abbreviated to EGR hereafter) device 30, a diesel oxidative catalyst (to be abbreviated to DOC hereafter) 40, and a diesel particulate filter (to be abbreviated to DPF hereafter) assembly 50.

The fuel of the diesel engine 10 is pressurized by a high pressure pump 14, accumulated temporarily in a common rail 13, injected from an injector 12 in accordance with an injection timing, and burned by the diesel engine 10. Exhaust gas is then discharged from the diesel engine 10. A part of the exhaust gas is recirculated to the intake passage 21 via the EGR device 30.

The EGR device 30 comprises an EGR cooler 32 and an EGR valve 33 in an EGR passage 31. The EGR cooler 32 cools the exhaust gas that flows therein from the exhaust passage 23. The EGR valve 33 adjusts the EGR amount by opening and closing. The EGR valve 33 is duty-controlled by a controller 70.

The DOC 40 is provided in the exhaust passage 23 of the diesel engine 10. The DOC 40 contains a catalyst made of palladium, platinum, or the like. The DOC 40 generates heat through a catalytic reaction with unburned hydrocarbon that flows therein. This heat raises the temperature of the exhaust gas.

The DPF assembly 50 is provided downstream of the DOC 40. The DPF assembly 50 comprises a DPF 52 housed in a DPF housing 51. The DPF 52 is a porous, honeycomb structure exhaust gas filter constituted by a ceramic such as cordierite, for example. The DPF 52 includes flow passages formed in matrix form from porous thin walls. The inlets to the flow passages are alternately sealed. The flow passages whose inlet is not sealed have a sealed outlet. The exhaust gas that flows into the DPF 52 passes through the porous thin walls forming the flow passages, and is discharged to the downstream side.

PM contained in the exhaust gas is trapped on an inside surface of the porous thin walls and accumulated there. A part of the trapped PM is burned by the DPF, but when a bed temperature of the DPF is low, the combustion amount decreases, and as a result, the amount of accumulated PM is greater than the amount of burned PM. If this state is maintained while the DPF continues to trap PM, eventually a blockage occurs. Therefore, an exhaust gas filter regeneration control device 1 according to this invention raises the exhaust gas temperature such that the trapped PM is forcibly burned and removed. The exhaust gas filter regeneration control device 1 comprises the following sensors 61 to 65.

A differential pressure sensor 61 detects a differential pressure between an upstream chamber 51*a* (the inlet of the DPF 52) and a downstream chamber 51*b* (the outlet of the DPF 52) of the DPF housing 51.

A DPF inlet temperature sensor 62 detects an inlet temperature Tin of the DPF 52.

A DPF outlet temperature sensor 63 detects an outlet temperature Tout of the DPF 52.

A crank angle sensor 64 detects the rotation speed of a crankshaft 11 of the diesel engine 10.

An air flow meter 65 detects an intake air amount (fresh air amount) of the diesel engine 10.

Detection data from the above sensors 61 to 65 are input respectively into the controller 70 as signals.

The controller 70 estimates a PM accumulation amount PMa1 in the DPF 52 based on the magnitude of the differential pressure detected by the differential pressure sensor 61. The controller 70 also determines a PM discharge amount PMa21 in an identical, fixed time period from the operating conditions (for example, the rotation speed and fuel injection amount) of the engine by referring to a PM discharge amount map stored in ROM in advance. Further, the controller 70 determines a PM combustion amount PMa22 in a fixed time period from the bed temperature of the DPF 52 and the inlet temperature of the DPF 52 by referring to a PM combustion map stored in the ROM in advance. Then, by adding a value obtained by subtracting the PM combustion amount PMa22 in the fixed time period from the PM discharge amount PMa21 in the fixed time period to a PM accumulation amount previous value PMa2z, or in other words using the following Equation (1), a PM accumulation amount PMa2 at the present time is calculated.

$$PMa2 = PMa2z + PMa21 - PMa22 \quad (1)$$

The controller 70 determines the DPF regeneration timing on the basis of the PM accumulation amounts PMa1, PMa2.

The controller 70 inputs an inlet temperature signal from the DPF inlet temperature sensor 62 and an outlet temperature signal from the DPF outlet temperature sensor 63, and calculates the bed temperature of the DPF 52 on the basis thereof. The controller 70 then determines an optimum shift speed (gear ratio) from the operating conditions of the engine, and calculates a traveled distance in accordance with a signal from the crank angle sensor 64.

The controller 70 also adjusts the fuel injection amount and injection timing by controlling the injector 12 and high pressure pump 14 on the basis of input signals. The controller 70 adjusts the opening of the intake air throttle valve 22 on the basis of an input signal. The controller 70 duty-controls the EGR valve 33. By executing this control, the controller 70 adjusts an excess air factor (air-fuel ratio) to regulate the amount of hydrocarbon contained in the exhaust gas, and executes DPF regeneration by raising the temperature of the exhaust gas flowing out from the DOC 40.

Further, on the basis of a detection signal from the air flow meter 65, the controller 70 determines whether the operating conditions of the engine correspond to a deceleration operation or a steady state operation.

The controller 70 comprises a microcomputer provided with a central processing unit (CPU), read-only memory (ROM), random access memory (RAM) and input/output interface (I/O interface). The controller may comprise plural microcomputers.

Next, focusing on an operation of the controller 70, a specific operation of the exhaust gas filter regeneration control device according to this invention will be described.

Figure 2:
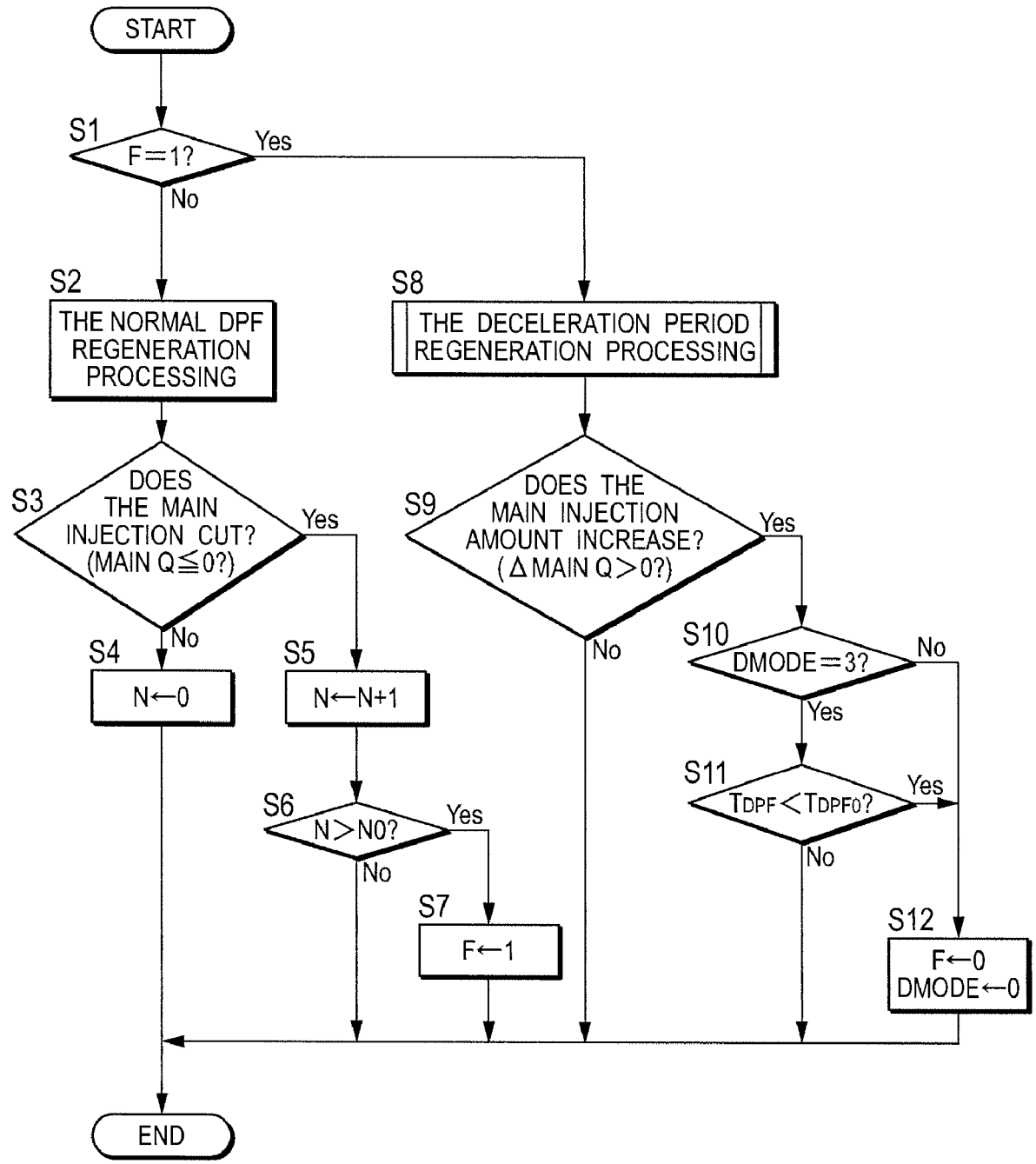
FIG. 2 is a flowchart showing a main routine executed by a controller according to this invention.

FIG. 2 is a flowchart showing a main routine executed by the controller 70. The controller 70 executes this processing repeatedly at fixed time intervals (in a 10 millisecond cycle, for example) during DPF regeneration control.

In a step S1, the controller 70 determines whether or not a deceleration flag F is at unity. The initial value of the deceleration flag F is zero. When the determination is negative, the processing advances to a step S2. When the determination is affirmative, the processing advances to a step S8.

In the step S2, the controller 70 performs normal DPF regeneration processing.

In a step S3, the controller 70 determines whether or not deceleration is underway according to whether or not the main injection has been cut. More specifically, this determination is made according to whether or not a main fuel injection amount Q is zero or less. When the main fuel injection amount Q is zero or less, i.e. when the determination is affirmative, the processing advances to a step S5. When the determination is negative, the processing advances to a step S4.

In the step S4, the controller 70 resets a counter N.

In the step S5, the controller 70 increments the counter N. As described above, the controller 70 executes this routine repeatedly at fixed time intervals, and therefore the deceleration duration can be calculated from the counter N.

In a step S6, the controller 70 determines whether or not the counter N exceeds a reference count N0. By providing the reference count N0, it is possible to determine with certainty that deceleration is underway. When the determination is affirmative, the processing advances to a step S7. When the determination is negative, the routine is temporarily interrupted.

In the step S7, the controller 70 sets the deceleration flag F to unity.

In the step S8, the controller 70 performs deceleration period regeneration control. The specific content of this control will be described later.

In a step S9, the controller 70 determines whether or not the main injection amount has increased. When the determination is affirmative, the processing advances to a step S10. When the determination is negative, the routine is temporarily interrupted.

In the step S10, the controller 70 determines whether or not a mode flag DMODE is at 3. When the determination is affirmative, the processing advances to a step S11. When the determination is negative, the processing advances to a step S12. The mode flag DMODE will be described later.

In the step S11, the controller 70 determines whether or not a bed temperature TDPF of the DPF 52 has fallen below a reference temperature TDPF0. The reference temperature TDPF0 is a temperature at which the PM accumulated in the DPF 52 ignites. When the determination is affirmative, the processing advances to the step S12. When the determination is negative, the routine is temporarily interrupted.

In the step S12, the controller 70 resets the deceleration flag F and the mode flag DMODE.

Figure 3:
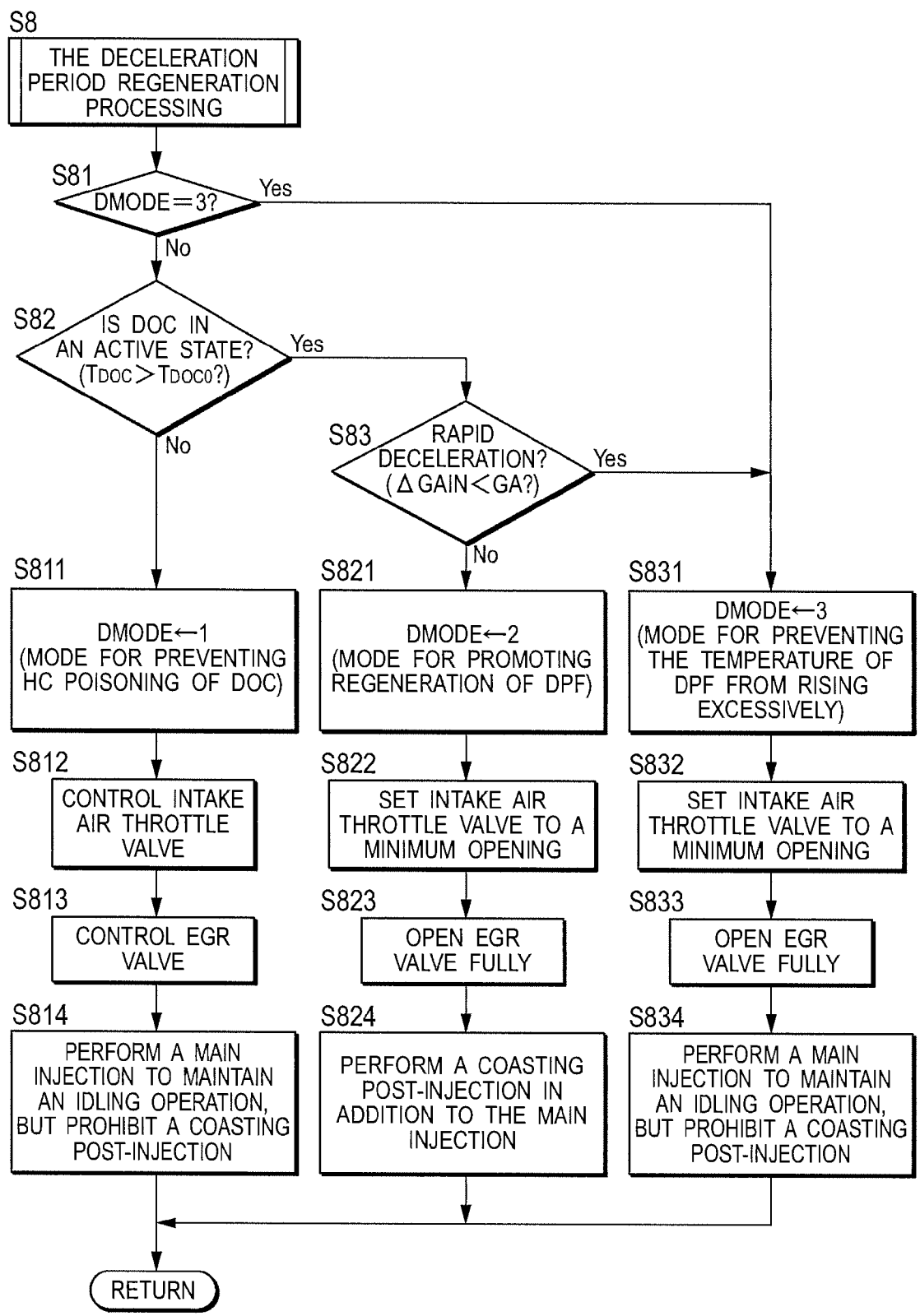
FIG. 3 is a flowchart showing deceleration period regeneration processing executed by the controller.

FIG. 3 is a flowchart showing the deceleration period regeneration processing executed by the controller.

In a step S81, the controller 70 determines whether or not the mode flag DMODE is at 3. When the determination is negative, the processing advances to a step S82. When the determination is affirmative, the processing advances to a step S831.

In the step S82, the controller 70 determines whether or not the DOC 40 is in an active state. More specifically, the controller 70 determines whether or not the bed temperature TDOC of the DOC 40 exceeds an activation reference temperature TDOC0. When the determination is negative, the processing advances to a step S811. When the determination is affirmative, the processing advances to a step S83.

In the step S83, the controller 70 determines whether or not rapid deceleration is underway. More specifically, the controller 70 determines whether or not a rate of change ΔGain in the intake air amount per unit time is smaller than a reference value GA. When the determination is negative, the processing advances to a step S821. When the determination is affirmative, the processing advances to the step S831.

In the step S811, the controller 70 sets the mode flag DMODE to 1, indicating a mode for preventing HC poisoning of the DOC 40. In a step S812, the controller 70 controls the intake air throttle valve 22 in accordance with the operating conditions, and in a step S813, the controller 70 controls the EGR valve 33 in accordance with the operating conditions.

In a step S814, the controller 70 performs a main injection to maintain an idling operation, but prohibits a coasting post-injection to prevent HC poisoning of the DOC 40.

In the step S821, the controller 70 sets the mode flag DMODE to 2, indicating a mode for promoting regeneration of the DPF 52. In a step S822, the controller 70 sets the intake air throttle valve 22 to a minimum opening, and in a step S823, the controller 70 opens the EGR valve 33 fully to raise the temperature of the intake air that is taken into the engine.

In a step S824, the controller 70 performs a coasting post-injection in addition to the main injection for maintaining idling. In so doing, the temperature of the gas flowing into the DPF 52 can be raised by a catalytic action generated by hydrocarbon and the like flowing into the DOC 40. As a result, the bed temperature of the DPF 52 increases such that the DPF 52 is regenerated.

In the step S831, the controller 70 sets the mode flag DMODE to 3, indicating a mode for preventing the temperature of the DPF 52 from rising excessively. In a step S832, the controller 70 sets the intake air throttle valve 22 to a minimum opening, and in a step S833*, the controller 70 opens the EGR valve 33 fully to reduce the oxygen concentration of the exhaust gas.

In a step S834, the controller 70 ensures that the temperature of the gas flowing into the DPF 52 does not increase. More specifically, the controller 70 only performs a main injection for maintaining idling, and does not perform a coasting post-injection.

FIG. 4 is a timing chart illustrating the results of control executed following gentle deceleration when the catalyst is inactive (DMODE 1; mode for preventing HC poisoning of DOC), according to this invention. Step numbers are also noted to facilitate understanding of the correspondence between the timing chart and flowchart.

Prior to a time t11, reduced speed traveling is not underway, and therefore the controller 70 subjects the DPF 52 to normal regeneration processing by executing the steps S1, S2, S3, and S4 repeatedly.

When deceleration is performed at the time t11 by releasing the accelerator pedal, the controller 70 executes the steps S1, S2, S3, S5, and S6 repeatedly and counts the deceleration period. At this time, as shown in FIG. 4B, the main fuel injection amount Q is zero. When the deceleration period passes a predetermined period (time t12), the processing advances from the step S6 to the step S7, where the deceleration flag F is set at unity, and in the following cycle, the processing advances from the step S1 to the step S8, where deceleration period regeneration processing is performed.

At this time, as shown in FIG. 4A, the bed temperature TDOC of the DOC 40 is lower than the activation reference temperature TDOC0, and therefore the processing advances from the step S82 to the step S811, where the intake air throttle valve 22 and EGR valve 33 are controlled in accordance with the operating conditions (S812, S813). More specifically, the EGR valve 33 is opened and the intake air throttle valve 22 is closed in accordance with the decrease in the intake air amount Gain (FIGS. 4C, 4D). In so doing, the temperature of the air taken into the engine is raised, leading to an increase in the exhaust gas temperature and a reduction in the bed temperature of the DOC 40 and the DPF 52 (FIG. 4A). Further, fuel is only injected at the main injection timing, and no fuel is injected at the coasting post-injection timing (FIG. 4B, S814). Thus, HC poisoning of the DOC 40 is prevented.

When the accelerator pedal is depressed at a time t14 such that the main injection is resumed (FIG. 4B, S9), the controller 70 resets the deceleration flag F and mode flag DMODE (S10), and returns to the normal regeneration processing in the following cycle. When the DOC 40 becomes active, post-injection is begun (time t15 in FIG. 4B).

FIG. 5 is a timing chart illustrating the results of control executed following gentle deceleration when the catalyst is active (DMODE 2; mode for promoting DPF regeneration), according to this invention.

Prior to a time t21, reduced speed traveling is not underway, and therefore the controller 70 subjects the DPF 52 to normal regeneration processing by executing the steps S1, S2, S3, and S4 repeatedly.

When deceleration is performed at the time t21 by releasing the accelerator pedal, the controller 70 executes the steps S2, S2, S3, S5, and S6 repeatedly and counts the deceleration period. At this time, as shown in FIG. 5B, the main fuel injection amount Q is zero. When the deceleration period passes a predetermined period (time t22), the processing advances from the step S6 to the step S7, where the deceleration flag F is set at unity, and in the following cycle, the processing advances from the step S1 to the step S8, where deceleration period regeneration processing is performed.

At this time, as shown in FIG. 5A, the bed temperature TDOC of the DOC 40 is higher than the activation reference temperature TDOC0, and therefore the processing advances from the step S82 to the step S83. Also, the rate of change ΔGain in the intake air amount is greater than the reference value GA, and it is therefore determined that gentle deceleration is underway (S83). Hence, the processing advances to the step S821, where the intake air throttle valve 22 is set at the minimum opening (FIG. 5D, S822), and the EGR valve 33 is opened fully (FIG. 5C, S823). In so doing, the temperature of the air that is taken into the engine is increased, leading to an increase in the exhaust gas temperature, and as a result, the bed temperature of the DOC 40 and the DPF 52 decreases (FIG. 5A). Further, fuel is injected at the coasting post-injection timing in addition to the main injection timing (FIG. 5B, S824), and as a result, the temperature of the exhaust gas is raised by the catalytic reaction in the DOC 40, leading to an increase in the temperature of the DPF 52 such that regeneration is promoted (FIG. 5A).

When the accelerator pedal is depressed at a time t24 such that the main injection is resumed (FIG. 5B, S9), the controller 70 resets the deceleration flag F and mode flag DMODE (S10), and returns to the normal regeneration processing in the following cycle.

FIG. 6 is a timing chart illustrating the results of control executed following a rapid deceleration when the catalyst is active (DMODE 3; mode for preventing excessive increase in DPF temperature), according to this invention.

Prior to a time t31, reduced speed traveling is not underway, and therefore the controller 70 subjects the DPF 52 to normal regeneration processing by executing the steps S1, S2, S3, and S4 repeatedly.

When deceleration is performed at the time t31 by depressing a brake pedal, the controller 70 executes the steps S1, S2, S3, S5, and S6 repeatedly and counts the deceleration period. At this time, as shown in FIG. 6B, the main fuel injection amount Q is zero. When the deceleration period passes a predetermined period (time t32), the processing advances from the step S6 to the step S7, where the deceleration flag F is set at unity, and in the following cycle, the processing advances from the step S1 to the step S8, where deceleration period regeneration processing is performed.

Figure 6A:
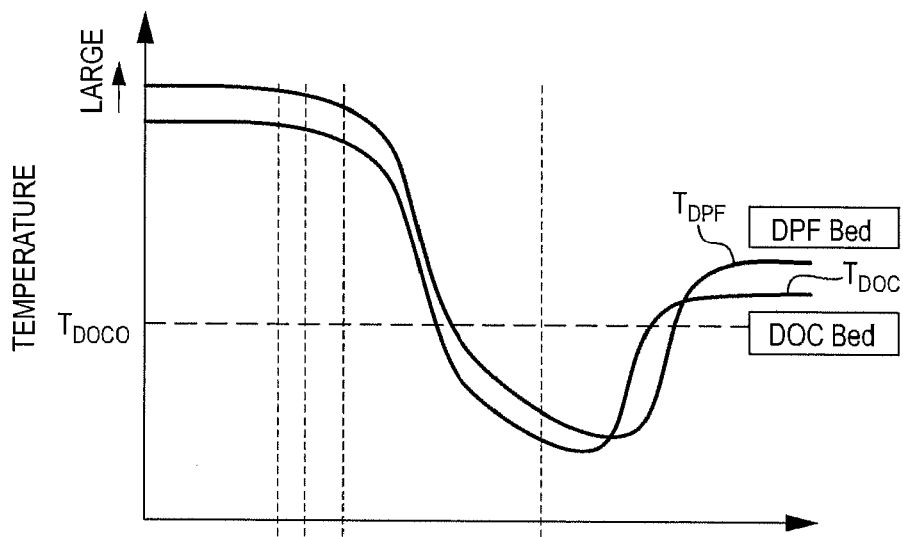
FIGS. 6A-6D are timing charts illustrating the results of control executed during rapid deceleration when the catalyst is active, according to this invention.
Figure 6B:
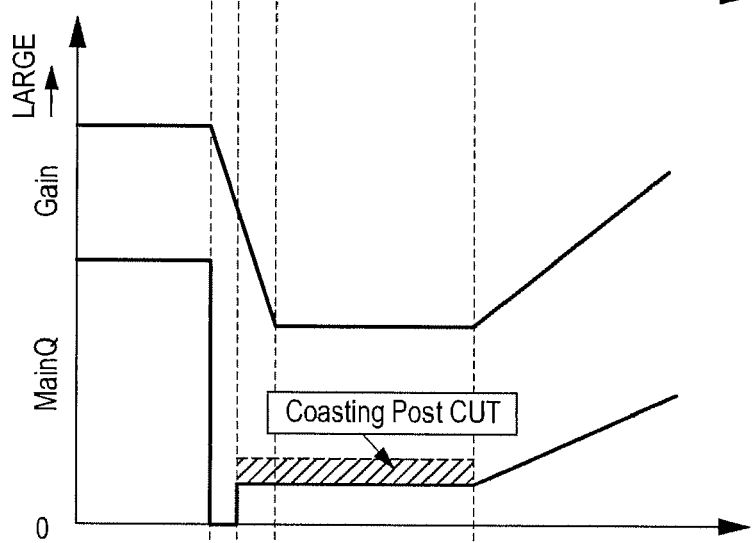
Figure 6C:
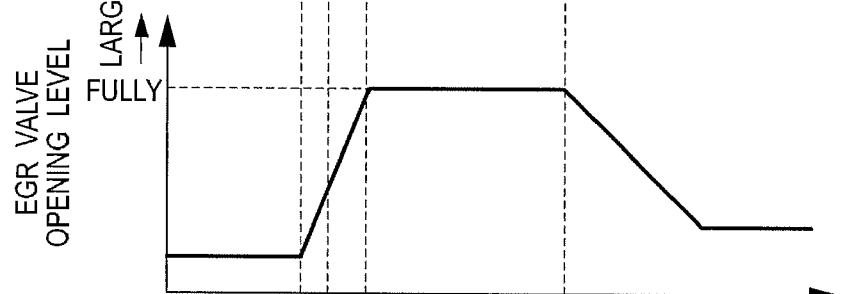
Figure 6D:
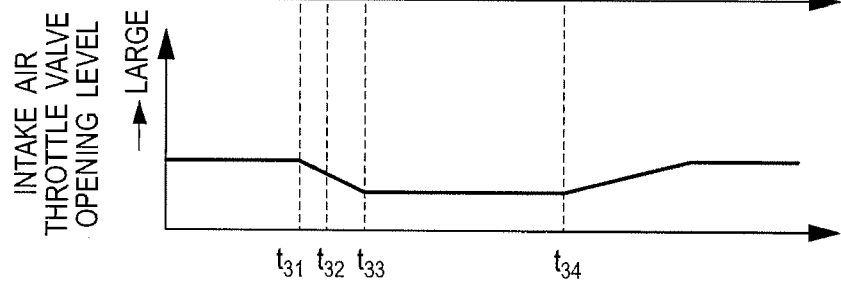

At this time, as shown in FIG. 6A, the bed temperature TDOC of the DOC 40 is higher than the activation reference temperature TDOC0, and therefore the processing advances from the step S82 to the step S83. Further, the rate of change ΔGain in the intake air amount is smaller than the reference value GA, and it is therefore determined that rapid deceleration is underway (S83). Hence, the processing advances to the step S831, where the intake air throttle valve 22 is set at the minimum opening (FIG. 6D, S832) and the EGR valve 33 is opened fully (FIG. 6C, S833). In so doing, the oxygen concentration of the exhaust gas is reduced, thereby reducing the amount of catalytic reaction in the DOC 40 and PM combustion in the DPF 52. Furthermore, fuel is only injected at the main injection timing, and no fuel is injected at the coasting post-injection timing (FIG. 6B, S834). As a result, the temperature of the DPF 52 is prevented from rising excessively.

According to this invention, when the DOC 40 is in an active state, fuel is injected at the coasting post-injection timing as well as the main injection timing, and as a result, the exhaust gas temperature is raised by the catalytic reaction in the DOC 40 such that the DPF 52 is regenerated (S824). However, when it is determined that rapid deceleration is underway, fuel is only injected at the main injection timing, and no fuel is injected at the coasting post-injection timing (S834).

During rapid deceleration, the intake air amount decreases rapidly and the amount of exhaust gas flowing through the exhaust passage also decreases rapidly. The DPF 52 is air-cooled by the exhaust gas flow, but when the amount of exhaust gas decreases, the air-cooling effect is reduced. If fuel is injected at the coasting post-injection timing as well as the main injection timing, similarly to the control performed during gentle acceleration, when the air-cooling effect is reduced, the exhaust gas temperature is raised by the catalytic reaction in the DOC 40, and as a result, the temperature of the DPF 52 may rise excessively such that the DPF 52 melts.

As described above, when it is determined that rapid deceleration is underway in this embodiment, the oxygen concentration of the exhaust gas flowing through the exhaust passage is reduced, and fuel is only injected at the main injection timing and not at the coasting post-injection timing. As a result, the temperature of the DPF 52 does not rise excessively, and the DPF 52 is prevented from melting.

Although the invention has been described above by reference to certain embodiments of the invention, the invention is not limited to the embodiments described above. Modifications and variations of the embodiments described above will occur to those skilled in the art, within the scope of the claims.

The controller may comprise plural microcomputers.

In each of the above an embodiment, the parameters required for control are detected using sensors, but this invention can be applied to any exhaust gas filter regeneration control device which can perform the claimed control using the claimed parameters regardless of how the parameters are acquired.

In the embodiment described above, a diesel engine is cited as an example of the engine. However, a gasoline engine, for example, may be used instead.

Further, the determination as to whether or not deceleration is underway is made on the basis of the main fuel injection amount Q, but the determination may be made on the basis of the vehicle speed or the engine rotation speed. Also, the determination as to whether or not rapid deceleration is underway is made on the basis of the rate of change ΔGain in the intake air amount, but in this case also, the determination may be made on the basis of the vehicle speed or the engine rotation speed.

The contents of Tokugan 2005-360069 with a filing date of Dec. 14, 2005 in Japan are hereby incorporated by reference.

The embodiments of this invention in which an exclusive property or privilege is claimed are defined as follows:

What is claimed is:

1. An exhaust gas filter regeneration control device used together with a diesel engine comprising:
   a fuel injector which injects fuel into the engine,
   an exhaust gas filter which is provided in an exhaust passage of the engine, and which traps particulate matter contained in an exhaust gas of the engine to prevent the particulate matter from being discharged into the atmosphere, and
   a catalyst which is provided in the exhaust passage upstream of the exhaust gas filter, and which raises an exhaust gas temperature through a catalytic reaction with components of a post-injected fuel when the exhaust gas filter is to be regenerated, the device comprising a programmable controller programmed to:
      determine whether or not the engine is decelerating during the regeneration of the exhaust gas filter;
      determine whether or not the catalyst is active when the engine is decelerating;
      determine whether the engine is decelerating gently or decelerating rapidly when the catalyst is active;
      cause the fuel injector to perform a post-injection following a main fuel injection when the engine is decelerating gently; and
      cause the fuel injector to perform the main fuel injection but not to perform the post-injection when the engine is decelerating rapidly.

2. The exhaust gas filter regeneration control device as defined in claim 1, wherein the controller is further programmed to close an intake air throttle valve of the engine to raise a temperature of an intake air taken into the engine, when the catalyst is active and the engine is decelerating gently.

3. The exhaust gas filter regeneration control device as defined in claim 1, wherein the controller is further programmed to open an EGR valve to raise the temperature of an intake air taken into the engine, when the catalyst is active and the engine is decelerating gently.

4. The exhaust gas filter regeneration control device as defined in claim 1, wherein the controller is further programmed to close an intake air throttle valve of the engine to reduce an amount of oxygen flowing through the exhaust gas filter when the catalyst is active and the engine is decelerating rapidly.

5. The exhaust gas filter regeneration control device as defined in claim 1, wherein the controller is further programmed to open an EGR valve to reduce an amount of oxygen flowing through the exhaust gas filter when the catalyst is active and the engine is decelerating rapidly.

6. The exhaust gas filter regeneration control device as defined in claim 1, wherein the controller is further programmed to determine whether the engine is decelerating gently or decelerating rapidly on the basis of a rate of change in an intake air amount of the engine per unit time.

7. The exhaust gas filter regeneration control device as defined in claim 1, wherein the controller is further programmed to cause the fuel injector to perform the main fuel injection but not to perform the post-injection when the engine is decelerating and the catalyst is inactive.

* * * * *